Oct. 30, 1928.  
W. H. ALBEE ET AL  
1,689,219  
CLEAT TRIMMING MACHINE  
Filed Nov. 17, 1926  
3 Sheets-Sheet 1

INVENTORS  
William H. Albee  
and  
Arthur G. Davis,  
BY  
J. H. McCready,  
his ATTORNEY.

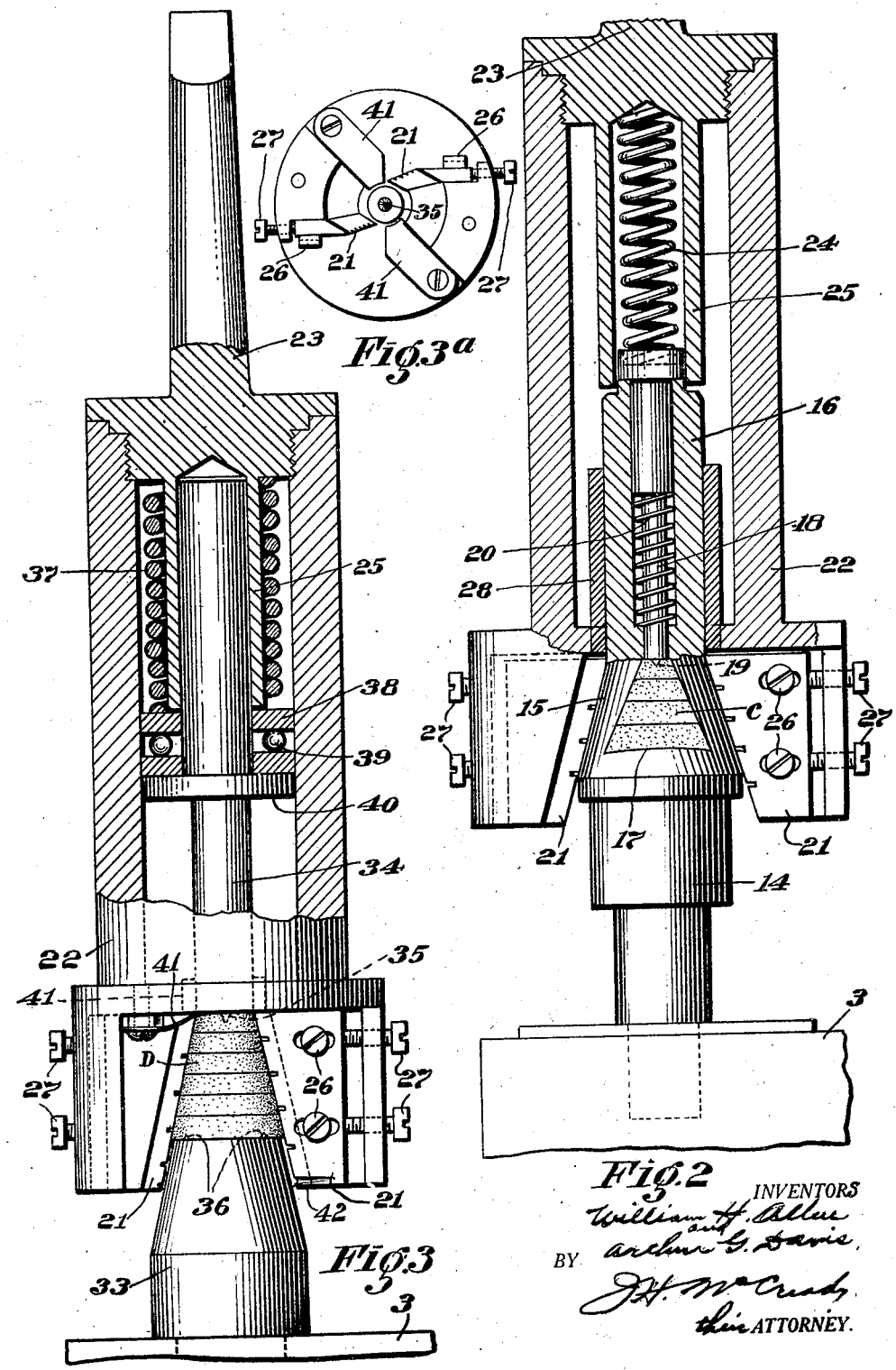

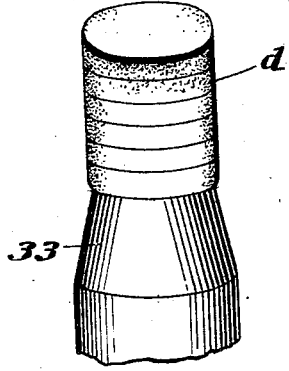
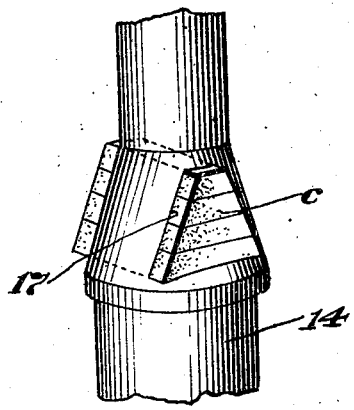
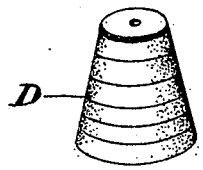
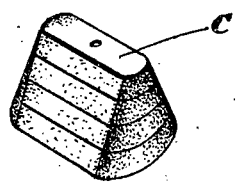
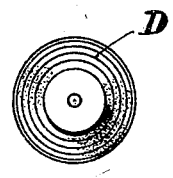
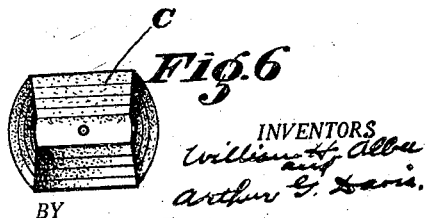

Patented Oct. 30, 1928.

1,689,219

UNITED STATES PATENT OFFICE.

WILLIAM H. ALBEE AND ARTHUR G. DAVIS, OF MARLBORO, MASSACHUSETTS, ASSIGNORS TO KOEHLER MANUFACTURING COMPANY, OF MARLBORO, MASSACHUSETTS, A CORPORATION OF MASSACHUSETTS.

CLEAT-TRIMMING MACHINE.

Application filed November 17, 1926. Serial No. 148,836.

This invention relates to machines for trimming football cleats.

The usual method of making football cleats includes the steps of building up a cleat blank by cementing lifts of leather, one upon the other, and then trimming the edges of the blank to produce the desired shape.

The present invention aims to devise a machine with which round ended or frusto-conical cleats can be trimmed rapidly and efficiently.

The nature of the invention will be readily understood from the following description when read in connection with the accompanying drawings, and the novel features will be particularly pointed out in the appended claims.

In the drawings,

Fig. 2 is a view, partly in side elevation, and partly in vertical cross-section, showing those parts of the machine which hold and operate on the cleat;

Fig. 3 is a view similar to Fig. 2 showing a slightly different embodiment of the invention;

Fig. 4 is a perspective view showing one step in the cleat trimming operation;

Figs. 5 and 6 are perspective and plan views, respectively, of a round ended cleat;

Fig. 7 is a perspective view showing a cleat blank of circular outline positioned for trimming; and Figs. 8 and 9 are perspective and plan views, respectively, of a frusto-conical cleat.

Figure 1:
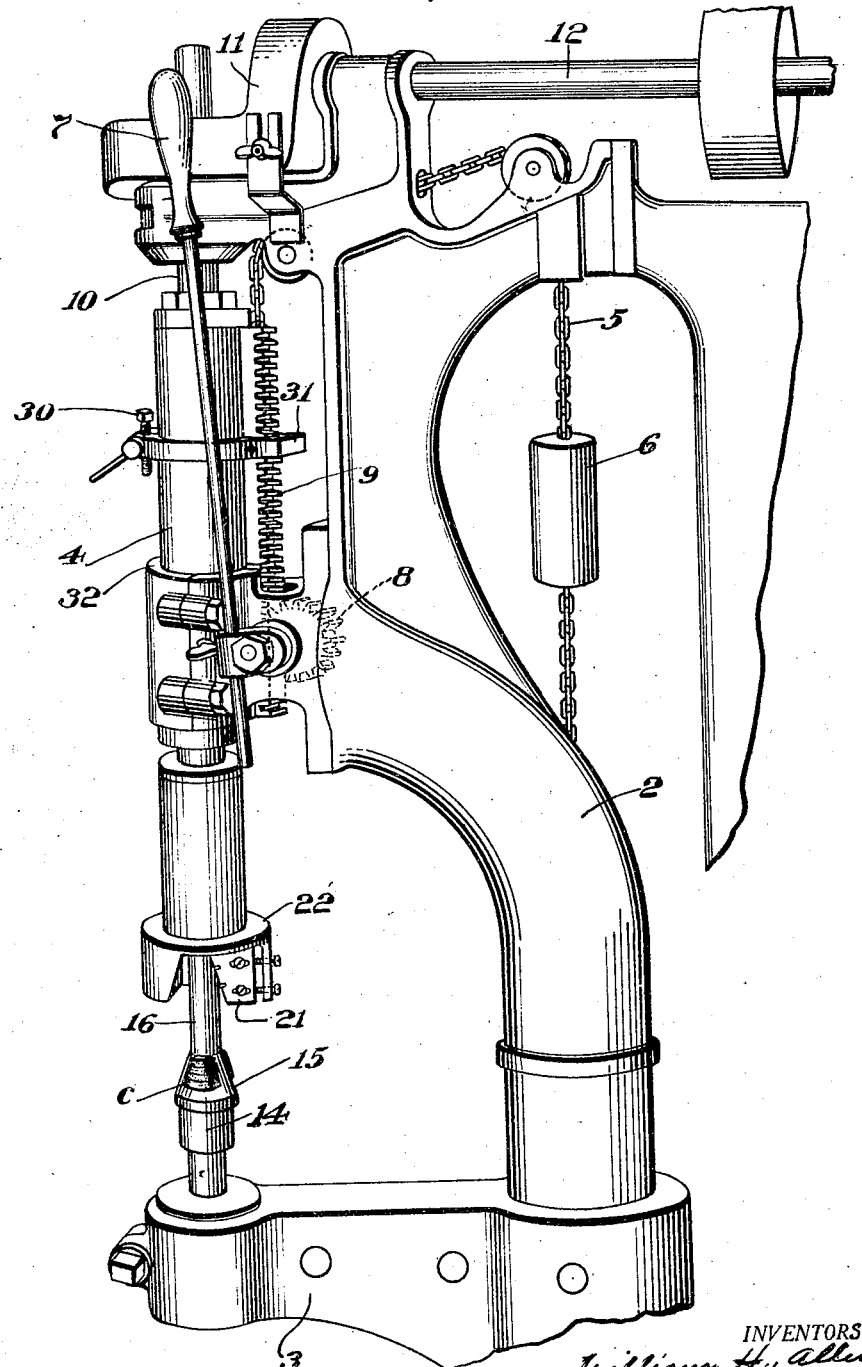
Figure 1 is a perspective view of the more important parts of a machine constructed in accordance with this invention.

Figs. 1 and 2 show a machine adapted especially for trimming the round ended type of cleat. Assuming that this cleat is made of leather, which is the more common practice, the preferred process consists in cutting out rectangular lifts of leather of suitable size, cementing these lifts together, one upon the other, to form a cleat blank, and then trimming the longitudinal edges of this blank by pushing it between stationary knives which are inclined to trim the cleat to the desired taper. The cleat next is molded and compressed, the molding operation concaving the bottom of the cleat. A cleat at substantially this stage in the process of manufacture is shown at c in Fig. 4. The next operation consists in trimming the ends to the rounded or convex form shown in Figs. 5 and 6, and the machine shown in Figs. 1 and 2 is designed to perform this operation.

Referring to Fig. 1 it will be observed that the machine there shown resembles a drill press closely in its general organization. In fact, the machine shown consists of a drill press modified in certain respects hereinafter described. This machine comprises the usual bracket 2, work support 3, and rising and falling head 4. The head is connected by a chain 5 to a weight 6 which serves to raise the head, and it is lowered by operating a hand lever 7 which rotates a pinion 8 meshing with a rack 9 which is secured to the rearward side of the head. A rapidly revolving spindle 10 is supported vertically in the head and is driven through gearing in the casing 11 and operated from a shaft 12 which is driven from any convenient source of power. The usual drill or drill chuck is dispensed with.

A special holder is provided to support the cleats for the trimming operation. This holder comprises a post 14 which is secured in the work support 3, the post including a frusto-conical portion 15 and a cylindrical extension 16 projecting from the upper end of said portion. Formed through the tapered section 15 is a cavity or pocket 17 adapted to receive the cleat to be trimmed. As shown in the drawings, this pocket is provided with a relatively broad bottom which is upwardly curved to correspond to the concave curve of the bottom of the cleat, and the side walls of the cavity are tapered to correspond to the taper of the cleat, the cavity being slightly larger than the cleat so as to permit the cleats to be inserted thereinto freely and easily removed therefrom. It may here be noted that the bottom surface of the cleats shown in Figs. 2, 4, 5 and 6 are curved on the surface of a cylinder, the axis of which extends lengthwise of the cleats, and accordingly, the bottom of the cavity 17 is correspondingly shaped.

The cleats are held in the cavity 17 by means of a plunger 18, Fig. 2, having a tip 19 to project into the cleat. This plunger is slidably supported in the extension 16 of the post 14, and a light coiled spring 20 normally holds the plunger upwardly so that its lower end is out of the cleat cavity.

The trimming operation is performed by two knives or cutters 21—21 which are removably supported in a cutter head 22 having a shank 23 to fit into the chuck cavity of the spindle of the machine, so that this cutter head both will rise and fall with the machine head 4, and will also be rapidly revolved by the spindle 10. A compression spring 24 is mounted in the cutter head 22 inside of a sleeve 25 where it will bear on the upper end of the plunger 18 and force this plunger down into its cleat holding position when the cutter head is lowered. The cutters or knives 21—21 are removably and adjustably secured in the cutter head by screws 26 and are backed up by thrust screws 27—27. It will be observed that the cutter head revolves about a vertical axis which coincides wtih the axis of the post 14 and passes centrally through the cleat $c$. Also, that the cutting edges of the knives 21—21 are inclined with reference to this axis, their inclination conforming to the taper of the frusto-conical portion 15 of the cleat holder. The cutter head is steadied by a bushing 28 secured fast therein and having a sliding fit on the stationary part 16.

In using the machine a cleat $c$ is inserted in the cavity 17, the cutter head 22 at this time being raised, as shown in Fig. 1. The handle 7 is then swung forwardly and downwardly, thus lowering the cutter head 22. Considerably before the cutter head arrives at the level of the cleat, the spring 24 forces the plunger 18 downwardly against the top of the cleat, thus pressing the cleat firmly against the bottom of the cavity 17, the pressure of the plunger on the cleat increasing as the cutter head is lowered. The rapidly revolving cutters 21 trim off the projecting ends of the cleat, removing all of the stock which projects from the cavity, and producing a trimmed surface which lies flush with and forms a continuation of the tapered surface 15 of the cleat holder. The fact that the cutter edges are set on the same taper as the surface of the cleat holder is of advantage in producing a clean cut, since the tapered surface of the holder forms a shearing block which cooperates with the knives as the trimming operation nears completion and produces a cleaner cut than otherwise counld be obtained. At the same time the fact that two cutters are used working in opposed relationship and acting simultaneously at opposite sides of the cleat, serves to neutralize any lateral or end thrust that might otherwise be exerted on the cleat and which would increase the difficulty of holding the cleat securely for the trimming operation. As above indicated, the cutter head continues to descend until the knives are almost in contact with the tapered surface of the holder 15, this movement of the cutter head being limited by an adjusting screw 30, Fig. 1, which is threaded through a bracket 31 adjustable on the head 4, the lower end of the screw being adapted to strike on the frame surface 32.

For the purpose of trimming a cleat to a frusto-conical form, a cleat support 33, Fig. 3, is substituted for the support 14 and the parts inside the cutter head 22 are modified somewhat. The cleat holder in this construction comprises the post or support 33, and a plunger 34 which is slidably mounted inside the cutter head 32. The lower end of this plunger is provided with a tip 35 to engage the top of the cleat D, and the upper surface of the support 33 may be provided with three or four prongs or spurs 36 to assist in preventing rotation of the cleat. In order to force the plunger 34 downwardly with the necessary pressure to hold the cleat securely for the trimming operation, a strong coiled spring 37 is located in the cutter head where it bears on the upper washer 38 of a ball thrust bearing 39 through which the pressure of the spring is transmitted to a collar 40 on the plunger 34. A bushing 41 fast in the cutter head serves to guide the plunger 34 as it rises and falls.

In manufacturing these frusto-conical cleats from leather, a series of leather disks are cemented together, one upon the other, to produce a blank as shown at D, Fig. 7. This blank is then placed on the support 33 of the cleat holder, the cutter head at this time being raised. As the cutter head is lowered by the movement of the lever 7, Fig. 1, the plunger 34 first engages the top of the cleat and presses this cleat firmly against its seat on the post 33, the pressure on the plunger increasing as the cutter head is lowered. The knives 21—21 trim the edges of the cleat in the manner above described, producing the desired frusto-conical form. It will be observed that the surface of the cleat support 33 adjacent to the cleat has a taper conforming to the taper which is to be given to the cleat, and that the cutting edges of the knives 21—21 are set to conform to this taper. Consequently, the upper end of the support 33 serves as a shearing block cooperating with the knives 21—21 in enabling them to make a clean cut at the bottom of the cleat, removing the burr or long feather edge which otherwise would be produced. In some cases also the lower end of the plunger 34 cooperates in a similar manner with the knives to remove the burr at the top of the cleat. Usually, however, we consider it preferable to use flat leaf springs 41—41, Figs. 3 and 3ª, in the cutter head where they will bear on the top of the cleat and hold the burr or "flash" down where it will be cut by the knives. These springs are particularly valuable in case soft leather is encountered. The finished cleat is shown in Figs. 8 and 9.

In case a cleat blank is too large or poorly built, it is of assistance in starting the cut to provide the lower ends of the blades 21—21 with cutting edges as shown at 42 in Fig. 3, this edge being formed by bevelling the edge on one side and forming a groove just above the edge on the other side.

Prior to this invention frusto-conical cleats have been used to only a very limited extent. They have been relatively expensive and difficult to obtain. This has been largely due to the labor expense involved in trimming them. The present invention materially expedites this operation. The cleats can be trimmed very rapidly with a high degree of accuracy, and a very satisfactory finished surface is produced.

While we have herein shown and described the best embodiments of our invention that we have so far devised, it will be evident that the invention may be embodied in other forms without departing from the spirit or scope thereof.

Having thus described our invention, what we desire to claim as new is:

1. In a machine for trimming football cleats, the combination of a holder including a member having a seat on which to support a cleat, said member being tapered adjacent to the cleat corresponding to the taper to be given to the cleat, said holder including a plunger for engaging the top of the cleat and holding it seated on said member, and a cutter cooperating with said holder to trim said cleat to a taper forming substantially a continuation of the taper of said member.

2. In a machine for trimming football cleats, the combination of a holder including a member having a seat on which to support a cleat, said member being tapered adjacent to the cleat corresponding to the taper to be given to the cleat, said holder including a plunger for engaging the top of the cleat and holding it seated on said member, and a cutter mounted to rotate about an axis extending through the cleat so positioned and having blades tapered to agree with the taper of said member, whereby said cutter is operative to trim said cleat to a taper forming substantially a continuation of the taper of said member.

3. In a machine for trimming football cleats, the combination of a holder for supporting a cleat in a substantially upright position, said holder comprising a member having a seat for supporting the bottom of the cleat and a plunger for engaging the top of the cleat and pressing it against said seat, a cutter head mounted to revolve about a vertical axis extending through said cleat, one or more blades carried by said cutter and operative to trim the cleat, means for raising and lowering said cutter head, a spring for forcing said plunger downwardly into its cleat holding position, and another spring for lifting said plunger out of engagement with said cleat when the cutter head is raised.

4. In a cleat trimming machine, a holder adapted to receive a cleat to be trimmed and to leave the part thereof to be trimmed off projecting from said holder while protecting other portions of the cleat, and means for trimming off said projecting portions of the cleat.

5. In a cleat trimming machine, the combination of a holder having a cavity to receive a cleat leaving the parts thereof to be trimmed off projecting from said holder, and rotary means for trimming off said projecting portions of the cleat substantially flush with the surfaces of the holder.

6. In a cleat trimming machine, a cleat holder having a cavity therein to receive a cleat leaving opposite ends of the cleat projecting therefrom, said cavity having a relatively wide bottom and side walls inclined toward each other as they extend upwardly from said bottom, and a plunger arranged to bear against a cleat positioned in said cavity and to hold the cleat therein.

7. In a cleat trimming machine, a cleat holder including a part having a frusto-conical external surface, and a cavity extending laterally through said part and opening to said surface at its opposite ends, said cavity having a relatively wide bottom and side walls extending upwardly from said bottom and inclined toward each other.

8. In a machine for trimming football cleats, the combination of means for engaging the top and bottom faces of a cleat approximately at the edges thereof and holding the cleat under compression during the trimming operation, and a rotary cutter mounted to revolve around an axis passing through a cleat so supported and operative to trim the cleat to a tapered form.

9. In a machine for trimming football cleats, the combination of means for engaging the top and bottom faces of a cleat and holding the cleat under compression during the trimming operation, and a rotary cutter mounted to revolve around an axis passing through a cleat so supported and operative to trim the edges of the cleat, said cutter having blades each provided with a cutting edge extending longitudinally of the side thereof adjacent to the cleat, said edges being inclined with reference to said axis and being arranged to engage the cleat simultaneously at points spaced circumferentially thereof.

10. In a machine for trimming football cleats, the combination of means for engaging the top and bottom faces of a cleat and holding the cleat under compression during the trimming operation, and a rotary cutter mounted to revolve around an axis passing through a cleat so supported and operative to trim the edges of the cleat, said cutter having a blade provided with a cutting edge extending longitudinally of the side thereof adjacent to the position occupied by the cleat, said edge being adapted to cut simultaneously across the entire edge of the cleat.

11. In a machine for trimming football cleats, the combination of means for engaging the top and bottom faces of a cleat and holding the cleat under compression during the trimming operation, and a rotary cutter mounted to revolve around an axis passing through a cleat so supported and operative to trim the edges of the cleat, said cutter having a blade provided with a cutting edge extending longitudinally of the side thereof adjacent to the position occupied by the cleat, said edge being inclined with reference to said axis, and a part of said holder serving as a shearing block to cooperate with said blade in trimming the cleat.

12. In a machine for trimming football cleats, the combination of means for engaging the top and bottom faces of a cleat and holding the cleat under compression during the trimming operation, a rotary cutter head mounted to revolve around an axis passing through a cleat so supported, a blade mounted in said head and provided with a cutting edge to engage and trim said cleat to a tapered form, said edge being formed on the side of said blade adjacent to the position occupied by the cleat and being inclined with reference to said axis, and means carried by said cutter head to bear on one end face of the cleat and cooperate with said blade to make a clean cut at said end.

13. In a machine for trimming football cleats, the combination of means for engaging the top and bottom faces of a cleat and holding the cleat under compression during the trimming operation, a rotary cutter head mounted to revolve around an axis passing through a cleat so supported, a blade mounted in said head and provided with a cutting edge to engage and trim said cleat, said edge extending along the side of said blade adjacent to the position occupied by the cleat, and a substantially flat resilient member carried by said cutter head and arranged to bear on an end face of the cleat to cooperate with said blade in making a clean cut at said end.

In testimony whereof we have signed our names to this specification.

WILLIAM H. ALBEE.
ARTHUR G. DAVIS.